(12) United States Patent
Kumar et al.

(10) Patent No.: US 10,788,053 B2
(45) Date of Patent: Sep. 29, 2020

(54) NOISE REDUCING GAS TURBINE ENGINE AIRFOIL

(71) Applicant: General Electric Company, Schenectady, NY (US)

(72) Inventors: Arun Kumar, Bangalore (IN); Nitesh Jain, Bangalore (IN); Nicholas Joseph Kray, Mason, OH (US); Thomas Ory Moniz, Loveland, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/170,254

(22) Filed: Oct. 25, 2018

(65) Prior Publication Data

US 2020/0132087 A1   Apr. 30, 2020

(51) Int. Cl.
*F04D 29/66* (2006.01)
*F01D 5/14* (2006.01)
*F02K 3/06* (2006.01)

(52) U.S. Cl.
CPC ........... *F04D 29/667* (2013.01); *F01D 5/141* (2013.01); *F02K 3/06* (2013.01); *F05D 2220/323* (2013.01); *F05D 2220/36* (2013.01); *F05D 2240/24* (2013.01); *F05D 2240/304* (2013.01); *F05D 2260/96* (2013.01)

(58) Field of Classification Search
CPC ...... F04D 29/667; F04D 29/68; F04D 29/681; F04D 29/684; F01D 5/141; F01D 5/145; F01D 5/186–188; F02K 3/06; F05D 2220/323; F05D 2220/36; F05D 2240/24; F05D 2240/304; F05D 2260/96
See application file for complete search history.

(56) References Cited

U.S. PATENT DOCUMENTS

| 3,572,960 A | 3/1971 | McBride | |
| 3,883,268 A * | 5/1975 | Evans | ...................... F01D 5/12 416/223 R |
| 5,785,498 A * | 7/1998 | Quinn | ...................... F01D 5/14 416/224 |

(Continued)

OTHER PUBLICATIONS

Halasz, Advanced Trailing Edge Blowing Concepts for Fan Noise Control: Experimental Validation, Virginia Polytechnic Institute and State University, Jun. 20, 2005, 138 Pages.

(Continued)

*Primary Examiner* — Nathaniel E Wiehe
*Assistant Examiner* — Ryan C Clark
(74) *Attorney, Agent, or Firm* — Dority & Manning, P.A.

(57) ABSTRACT

A noise reducing airfoil defining a span extending between a root and a tip and a chord at each point along the span extending between a leading edge and a trailing edge. The airfoil includes a pressure side, a suction side, and a trailing edge sheath including an outer surface coupled to the trailing edge of the airfoil. The trailing edge sheath extends at least partially along the chord on the pressure and suction sides at each point along the span within the trailing edge sheath. The trailing edge sheath defines a fluid passageway extending along at least a portion of the span. Further, the trailing edge sheath defines at least one aperture on at least one of the pressure side, the suction side, or trailing edge fluidly coupling the fluid passageway to the outer surface.

18 Claims, 6 Drawing Sheets

(56) References Cited

U.S. PATENT DOCUMENTS

| | | | |
|---|---|---|---|
| 7,393,183 B2* | 7/2008 | Keller | F01D 5/147 |
| | | | 416/223 A |
| 7,837,438 B2* | 11/2010 | Campbell | F01D 5/146 |
| | | | 415/191 |
| 8,016,561 B2 | 9/2011 | Moniz et al. | |
| 8,282,342 B2 | 10/2012 | Tonks et al. | |
| 9,103,215 B2 | 8/2015 | Fromentin et al. | |
| 9,719,358 B2 | 8/2017 | Neale et al. | |
| 9,995,152 B2* | 6/2018 | McComb | F01D 5/147 |
| 2008/0014095 A1* | 1/2008 | Moniz | F02K 3/06 |
| | | | 416/97 R |
| 2009/0317237 A1* | 12/2009 | Wood | F01D 5/146 |
| | | | 415/119 |
| 2013/0315725 A1* | 11/2013 | Uechi | F01D 5/189 |
| | | | 415/208.1 |
| 2016/0201480 A1* | 7/2016 | Foster | F04D 29/023 |
| | | | 415/200 |
| 2017/0234137 A1 | 8/2017 | Konitzer et al. | |
| 2017/0292531 A1 | 10/2017 | Snyder | |
| 2018/0230812 A1 | 8/2018 | Lim et al. | |

OTHER PUBLICATIONS

Woodward et al., Noise Benefits of Rotor Trailing Edge Blowing for a Model Turbofan, Research Gate, NASA/TM-2007-214666, AIAA-2007-1241, Glenn Research Center, Cleveland, OH, Mar. 2007, 32 pages.

Langford et al., Fan Flow Control for Noise Reduction Part 2: Investigation of Wake-Filling Techniques, AIAA-2005-3026, 11$^{th}$ AIAA/CEAS Aeroacoustics Conference (26$^{th}$ AIAA Aeroacoustics Conference) May 23-25, 200. (w Abstract Only).

* cited by examiner

NOISE REDUCING GAS TURBINE ENGINE AIRFOIL

FIELD

The present subject matter relates generally to airfoils, and more particularly, to noise reducing airfoils for gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Turbofan gas turbine engines typically include a fan assembly that channels air to the core gas turbine engine and to a bypass duct. During operation, the fan operates similarly to a propeller by supplying air downstream to the gas turbine engine and also pushing air through the exhaust nozzle at an increased velocity to provide thrust for the aircraft. More specifically, the fan imparts a swirling motion to the air prior to the air being channeled through the bypass duct. This swirling motion may cause a loss of momentum before the air exits the exhaust nozzle. Accordingly, at least some known turbofan engines include a set of stator vanes to facilitate reducing the air swirling motion before the bypass duct.

However, the airflow impacting the stator vanes may cause an increase in noise emissions. The unsteadiness in the fan flow may interact with the stators to create broadband noise. Further, fan air impacts the stator vanes at the rate of blades passing by and generates a tonal noise often referred to as the blade passing frequency (BPF). The fan air generates spinning mode noise produced by rotating pressure fields and wakes caused by the rotor blade, and the interaction thereof with the adjacent stator vanes. This noise is emitted from the engine both upstream through the inlet of the fan duct and downstream through the duct outlet. The spinning mode noise occurs at discrete frequencies including the fundamental blade passing frequency BPF, which is also a first harmonic, and higher order frequencies or harmonics thereof.

The broadband noise and tonal noise are two sources of engine noise. The reduction thereof is an environmental objective and is typically accomplished using various techniques including higher bypass ratio turbofans, acoustic liners inside the engine ducts and fan nacelle, and exhaust mixers. However, known attempts to address this important problem have involved indirect remedies that do not directly affect the source of the problem with clear undesirable side effects, such as added engine weight.

As such, there is a need for an airfoil that enables a reduction in the noise created by the airfoil while maintaining desired performance levels at potentially reduced overall engine weight.

BRIEF DESCRIPTION

Aspects and advantages will be set forth in part in the following description, or may be obvious from the description, or may be learned through practice of the invention.

In one aspect, the present subject matter is directed to a noise reducing airfoil defining a span extending between a root and a tip and a chord at each point along the span extending between a leading edge and a trailing edge. The airfoil includes a pressure side, a suction side, and a trailing edge sheath, defining an outer surface, coupled to the trailing edge of the airfoil. The trailing edge sheath extends at least partially along the chord on the pressure and suction sides at each point along the span within the trailing edge sheath. The trailing edge sheath defines a fluid passageway extending along at least a portion of the span. Further, the trailing edge sheath defines at least one aperture on at least one of the pressure side, the suction side, or trailing edge fluidly coupling the fluid passageway to the outer surface.

In one embodiment, the at least one aperture may be configured to supply pressurized air from the fluid passageway to the outer surface to reduce wakes, velocity deficits, or both. In one particular embodiment, the airfoil may further include a fluid inlet at the root fluidly coupled to the fluid passageway. In another embodiment, the trailing edge sheath may extend between the root and the tip along the span. In a further embodiment, each aperture of the at least one aperture may be positioned between a point along the span 50% of the span from the root and the tip. In several embodiments, each aperture of the at least one aperture may be positioned on the pressure or suction side. In such an embodiment, each aperture of the at least one aperture may be positioned between 10% and 20% of the chord from the trailing edge at a point along the span of each aperture.

In another embodiment, the at least one aperture may include at least one slot. In a further embodiment, the at least one aperture may include a plurality of blow holes distributed along the span. In one such embodiment, the plurality of blow holes may define at least one gap between adjacent blow holes. Further, each gap of the at least one gap may define the same length. In another embodiment, at least one gap proximate to the root may define a first length, and at least one gap proximate to the tip may define a second length different than the first length. Moreover, the first length may be longer than the second length. In additional embodiments, each blow hole of the plurality of blow holes may define a width on the outer surface and a length through the trailing edge sheath. Further, at least one blow hole may define a ratio of the length over the width between 0.9 and 1.1. In a still further embodiment, each blow hole of the plurality of blow holes may define a centerline and an exterior line on the outer surface tangent to a point nearest the leading edge and a point nearest the trailing edge of each blow hole on the outer surface. At least one of the blow holes may define a centerline having an aperture angle between the centerline and the exterior line of at least fifteen degrees but less than or equal to thirty degrees.

In a further embodiment, the airfoil may be a fan blade of a gas turbine engine.

In another aspect, the present subject matter is directed to a gas turbine engine defining a central axis. The gas turbine engine includes an engine shaft extending along the central axis, a compressor attached to the engine shaft and extending radially about the central axis, a combustor positioned downstream of the compressor to receive a compressed fluid therefrom, a turbine mounted on the engine shaft downstream of the combustor to provide a rotational force to the compressor, and a plurality of airfoils operably connected to the engine shaft. Each of the plurality of airfoils defines a span extending between a root and a tip and a chord at each point along the span extending between a leading edge and a trailing edge. The plurality of airfoils includes at least one noise reducing airfoil. The at least one noise reducing airfoil includes a pressure side, a suction side, and a trailing edge sheath, defining an outer surface, coupled to the trailing edge of the airfoil. The trailing edge sheath extends at least partially along the chord on the pressure and suction sides at each point along the span within the trailing edge sheath. The trailing edge sheath defines a fluid passageway extending along at least a portion of the span. Further, the trailing edge sheath defines at least one aperture on at least one of the pressure side, the suction side, or trailing edge fluidly coupling the fluid passageway to the outer surface.

In one embodiment, the gas turbine engine may further include a fan section including the plurality of airfoils configured as fan blades. In several embodiments, the compressor may be fluidly coupled to a fluid inlet at the root of each noise reducing airfoil such that the compressor is fluidly coupled to the fluid passageway. In certain embodiments, each airfoil of the plurality of airfoils is a noise reducing airfoil. In one such embodiment, each aperture of the at least one aperture may be positioned between a point along the span 50% of the span from the root and the tip.

In another embodiment, the plurality of airfoils may include a first plurality of airfoils and a second plurality of airfoils arranged to alternate around the engine shaft. In such an embodiment, each airfoil of the first plurality of airfoils may be a noise reducing airfoil. In a further such embodiment, the at least one aperture may include a plurality of blow holes distributed along the span. Moreover, the plurality of blow holes may define at least one gap between adjacent blow holes. At least one gap proximate to the root may define a first length, and at least one gap proximate to the tip may define a second length different than the first length. Further, the first length may be longer than the second length. It should be further understood that the gas turbine engine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
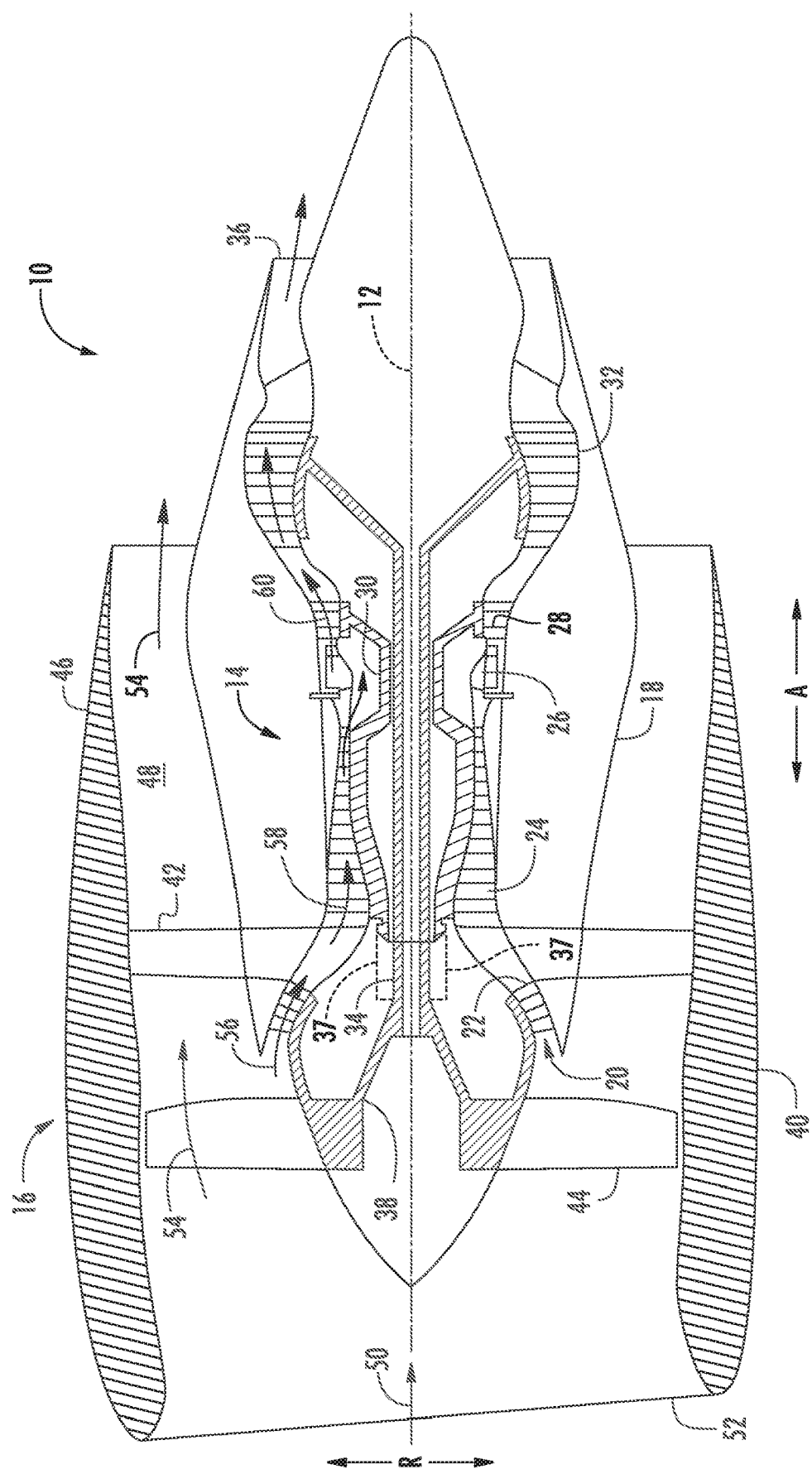
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A noise reducing airfoil for a gas turbine engine is generally provided. The airfoil may include a trailing edge sheath coupled to a trailing edge of the airfoil. The trailing edge sheath may extend at least partially along a pressure side and suction side of the airfoil. The trailing edge sheath defines a fluid passageway extending along at least a portion of the span. The trailing edge sheath includes one or more apertures on the pressure side, suction side, and/or trailing edge fluidly coupled to the fluid passageway. As such, pressurized air may be exhausted through the one or more apertures via the fluid passageway. Moreover, exhausting pressurized air at the pressure side, suction side, and/or trailing edge may reduce wakes and/or velocity deficits generated by the airfoil. As such, reducing the wakes and/or velocity deficits downstream of the airfoil may reduce noise (e.g., tonal noise) generated by a rotating airfoil.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Figure 2:
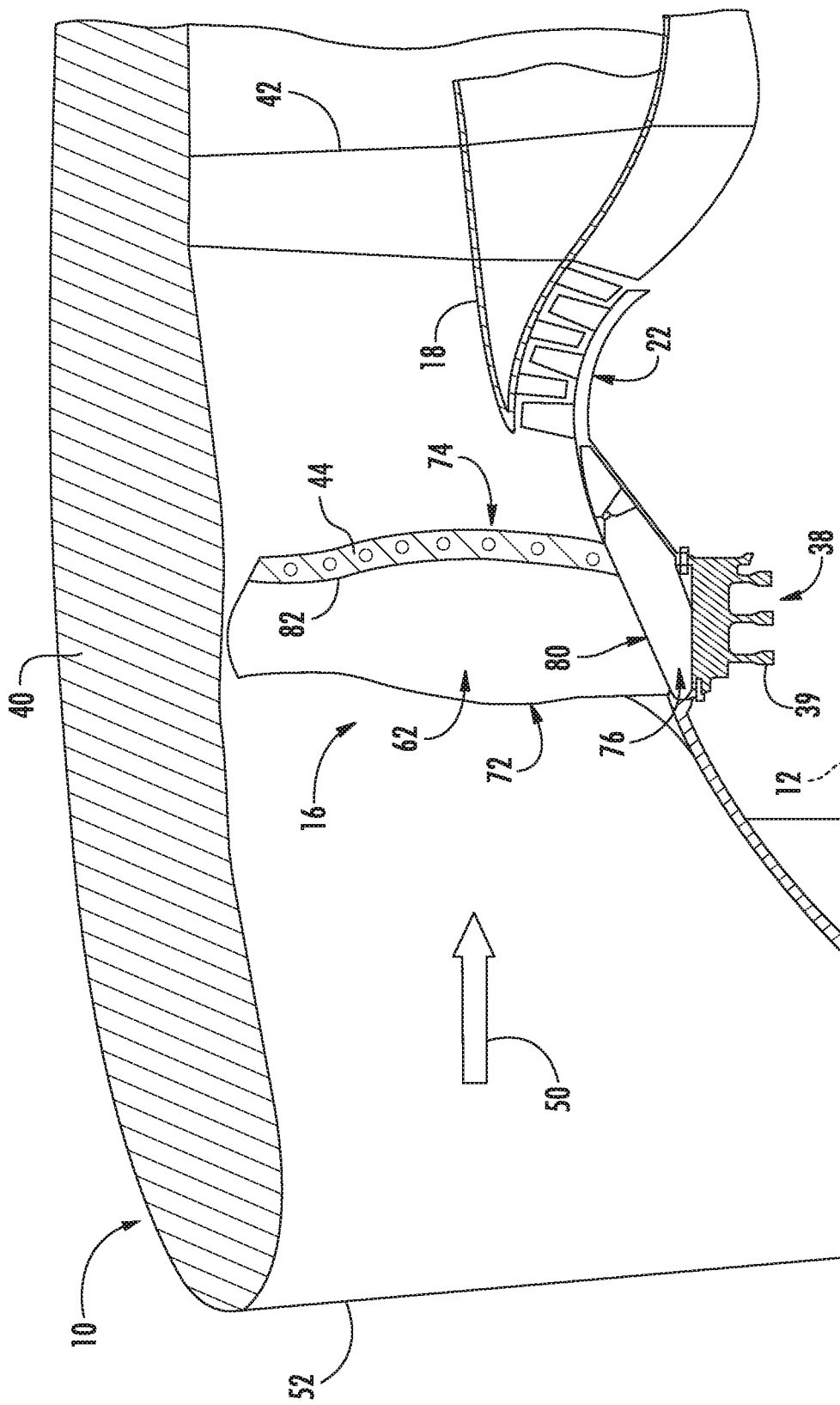
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
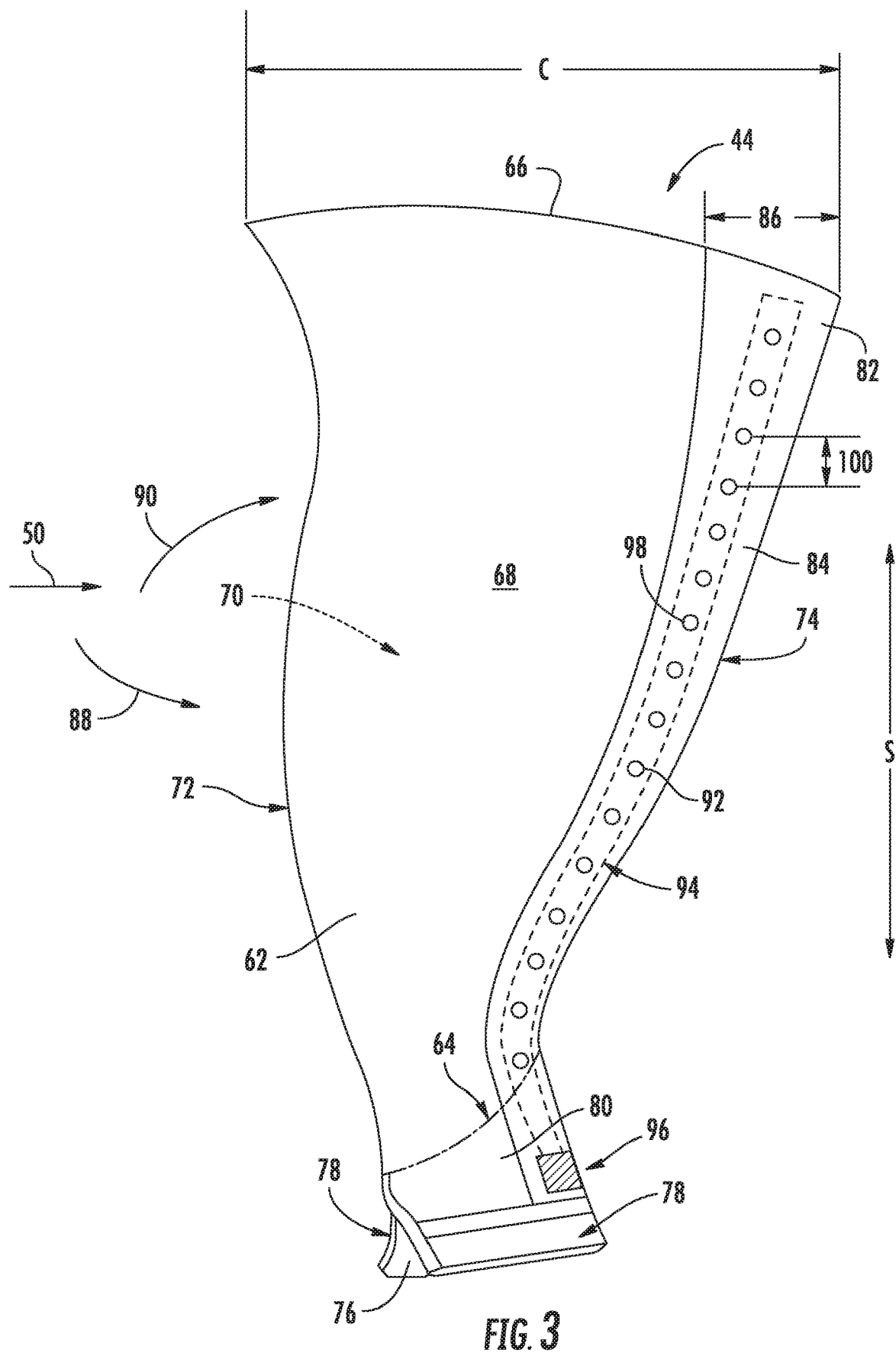
FIG. 3 illustrates a fan blade of the fan section of FIGS. 1 and 2 in accordance with aspects of the present subject matter, particularly illustrating a trailing edge sheath.

Referring to FIGS. 2 and 3, exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span S from an airfoil root 64 to an airfoil tip 66. A pressure side 68 and a suction side 70 of the airfoil 62 extend from the airfoil's leading edge 72 to a trailing edge 74 and between the airfoil root 64 and airfoil tip 66 along the span S. Further, it should be recognized that airfoil 62 may define a chord C at each point along the span S between the airfoil root 64 and the airfoil tip 66. Further, the chord C may vary along the span S of the airfoil 62. For instance, in the depicted embodiment, the chord C increases along the span S toward the airfoil tip 66. Though, in other embodiments, the chord C may be approximately constant throughout the span S or may decrease from the airfoil root 64 to the airfoil tip 66.

Optionally, each fan blade 44 includes an integral component having an axial dovetail 76 with a pair of opposed pressure faces 78 leading to a transition section 80. When mounted within the gas turbine engine 10, as illustrated in FIG. 2, the dovetail 76 is disposed in a dovetail slot of the fan rotor disk 39, thereby attaching the fan blades 44 to the fan rotor 38.

In the depicted embodiment, the airfoil 62 may include a trailing edge sheath 82 coupled to the trailing edge 74 of the airfoil 62. The trailing edge sheath 82 may be bonded to the trailing edge 74 of the airfoil 62. In other embodiments, it should be recognized that the trailing edge sheath 82 may be coupled to the trailing edge 74 using any suitable means, such as by adhesives, tape, welding, and/or mechanical fasteners (e.g., bolts, screws, and rivets). It should be appreciated that the trailing edge sheath 82 may be removably coupled to the trailing edge 74 of the airfoil 62 such that the trailing edge sheath 82 is replacable and/or repairable. For instance, the trailing edge sheath 82 may become worn or damaged during normal operation of the gas turbine engine 10 or during extreme events such as foreign object injection, rotor imbalance, fan blade detachment, etc. Further, it should also be recognized that the trailing edge sheath(s) 82 may be coupled to one or more airfoils 62 of existing gas turbine engines 10 in order to retrofit such existing gas turbine engines 10 to reduce noise generation.

In certain embodiments, as illustrated, the trailing edge sheath 82 may extend between the airfoil root 64 and the airfoil tip 66 along the span S. As such, the trailing edge sheath 82 may extend along the entire trailing edge 74 of the airfoil 62. Though, in other embodiments, the trailing edge sheath 82 may extend along a portion of the trailing edge 74 from the airfoil root 64 along the span S. For instance, the trailing edge sheath 82 may extend along at least 50% of the span S from the airfoil root 64, such as at least 75% of the span S. Particularly, in one embodiment, the trailing edge sheath 82 may extend along at least 90% of the span S from the airfoil root 64.

Referring now particularly to FIG. 3, the trailing edge sheath 82 may extend from the trailing edge 74 at least partially along the chord C on the pressure and suction sides 68, 70 (see, e.g., FIG. 5) at each point along the span S within the trailing edge sheath 82. In certain embodiments, the trailing edge sheath 82 may extend along the chord C on both the pressure and suction sides 68, 70 equally at each point along the span S. For instance, the trailing edge sheath 82 may define a first width 86 oriented from the trailing edge 74 to the leading edge 72 along the chord C at each point along the span S. As such, the trailing edge sheath 82 may extend along the first width 86 an equal amount along the pressure and suction sides 68, 70 at each point along the span S. It should be appreciated that the trailing edge sheath 82 may extend along any suitable length of the chord C at each point along the span S. In one embodiment, the trailing edge sheath 82 may extend along the full chord C at each point along the span S. For example, the trailing edge sheath 82 may wrap around the airfoil 62. Though, in other embodiments, the trailing edge sheath 82 may extend along less than the full chord C from the trailing edge 74 at each point along the span S. In one embodiment, the first width 86 may be at least 10% of the chord C at each point along the span S. For instance, the trailing edge sheath 82 may extend along at least 20% of the chord C at each point along the span S. More particularly, in one embodiment, the first width 86 may extend along at least 30% but less than 40% of the chord C at each point along the span S within the trailing edge sheath 82.

Though described as a symmetrical trailing edge sheath 82, it should be recognized that the trailing edge sheath 82 may be unsymmetrical about the trailing edge 74. For instance, in certain embodiments, the trailing edge sheath 82 may be extended along distinct distances on the pressure and suction sides 68, 70 from the trailing edge 74 along the chord C at each point along the span S within the trailing edge sheath 82. As such, the trailing edge sheath 82 may extend along the first width 86 on at least one of the pressure or suction sides 68, 70 and less than the first width 86 on the other of the pressure or suction side 68, 70 at each point along the span S within the trailing edge sheath 82.

The trailing edge sheath 82 may include an outer surface 84. More particularly, the outer surface 84 of the trailing edge sheath 82 may be exposed to the airflow 50 passing through the fan blades 44 as described generally in regards to FIG. 1. Generally, the airflow 50 passing over the airfoil 62 splits into pressure side air 88 traveling over the pressure side 68 and suction side air 90 that travels over the suction side 70. Further, the pressure side air 88 may travel over the pressure side 68 of the airfoil at an increased pressure but at a reduced velocity. On the other hand, the suction side air 90 generally travels over the suction side 70 of the airfoil 62 at a decreased pressure but at an increased velocity relative to the pressure side air 88 passing over the pressure side 68.

Moreover, the air 88, 90 passing over the pressure and suction sides 68, 70 generally meet downstream of the trailing edge 74 of the airfoil 62. Further, these two streams may meet and create wakes due to the pressure differential as well as velocity deficits between the suction side air 90 including a higher velocity and lower pressure than the pressure side air 88 including a higher pressure but lower velocity. As such, the velocity deficits and/or the wakes may create noise, such as tonal noise. Further, such tonal noise may be increased due to the interaction of the wakes and/or velocity deficits with downstream outlet guide vanes 42 positioned in the by-pass conduit 48 of the gas turbine engine 10. Such tonal noise may be decreased by one or more apertures 92 as described in more detail below.

Figure 5:
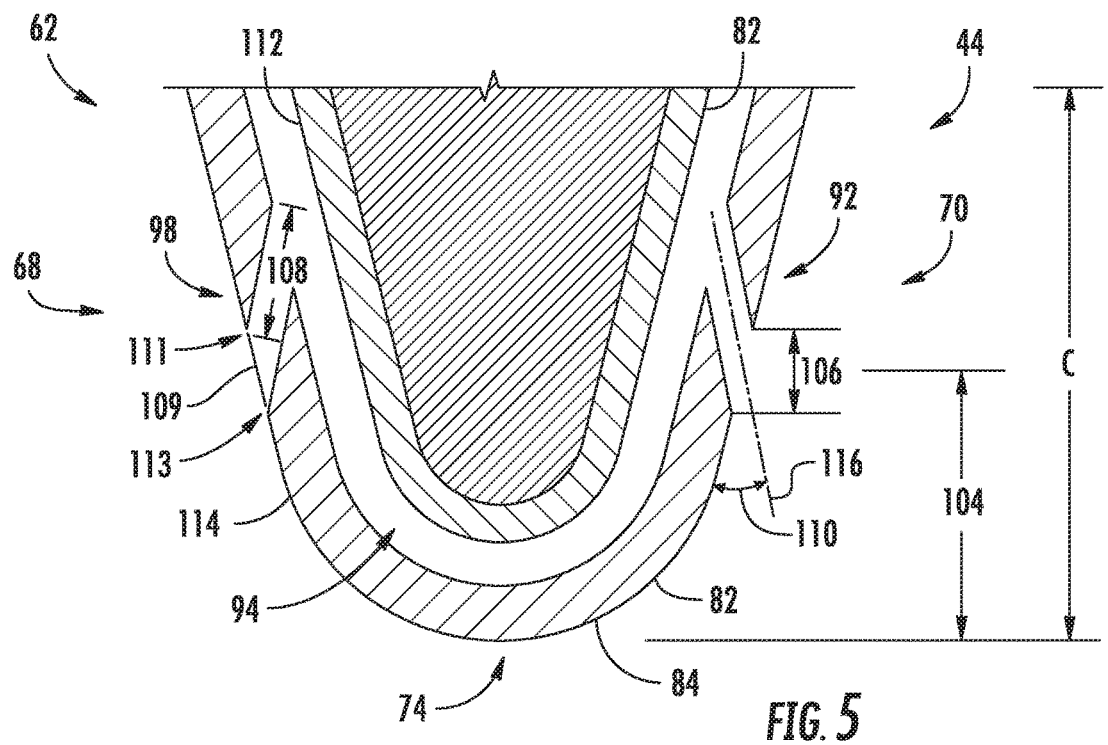
FIG. 5 illustrates one embodiment of an airfoil in accordance with aspects of the present subject matter, particularly illustrating a cross-section of the airfoil along a span and chord at a point along the span of at least one aperture.

As illustrated, the trailing edge sheath 82 may define a fluid passageway 94 extending along at least a portion of the span S (see also FIG. 5). For instance, the fluid passageway 94 may extend from the airfoil root 64 along approximately the same portion of the span S as the trailing edge sheath 82. It should be appreciated that the fluid passageway 94 may extend slightly less than the trailing edge sheath 82 in order to close the fluid passageway 94 toward the airfoil tip 66. For instance, the fluid passageway 94 may extend from the airfoil root 64 along the span S by 5% less of the span S than the trailing edge sheath 82. In embodiments where the trailing edge sheath 82 extends along the full span S, the fluid passageway 94 may be defined along the span S from the airfoil root 64 to a point along the span S within 5% of the span S from the airfoil tip 66.

In the illustrated embodiment of FIG. 3, the airfoil 62 may further include a fluid inlet 96 at the airfoil root 64 fluidly coupled to the fluid passageway 94. For example, the fluid inlet 96 may be defined in the trailing edge sheath 82 near the airfoil root 64. As such, pressurized air may be supplied to the fluid passageway 94 via the fluid inlet 96. In several embodiments, a compressor may be fluidly coupled to the fluid inlet 96 at the airfoil root 64 of the airfoil 62 such that the compressor is fluidly coupled to the fluid passageway 94. For example, the fluid inlet 96 may be fluidly coupled to a bleed port of the LP compressor 22. Though, in other embodiments, the fluid inlet 96 may be fluidly coupled to a bleed port of the HP compressor 24. Still further, the fluid inlet 96 may be fluidly coupled to a bleed port of the by-pass conduit 48, an intermediate compressor, or a turbine (such as one of the turbines 28, 30). It should be appreciated that the fluid inlet 96 may receive pressurized air from any suitable source and/or component within the gas turbine engine 10 or another independent source (e.g., a pump).

Further, the trailing edge sheath 82 may define at least one aperture 92 on at least one of the pressure side 68, the suction side 70, or trailing edge 74 fluidly coupling the fluid passageway 94 to the outer surface 84 of the trailing edge sheath 82. In several embodiments, each aperture 92 of the one or more apertures 92 may be positioned on the pressure or suction side 68, 70. For instance, two or more apertures 92 may mirror one another on the pressure and suction sides 68, 70. In another embodiment, the aperture(s) 92 may extend along the trailing edge 74 or approximately along the trailing edge 74 (see, e.g., FIG. 4).

The aperture(s) 92 may be configured to supply pressurized air from the fluid passageway 94 to the outer surface 84 of the trailing edge sheath 82 to reduce wakes, velocity deficits, or both caused by the airfoil 62. For instance, pressurized air may flow from a pressure source (e.g., the LP compressor 22) to the fluid inlet 96 of the trailing edge sheath 82. Subsequently, the pressurized air may flow through the fluid passageway 94 before being exhausted through the aperture(s) 92. As such, the aperture(s) 92 may reduce pressure differentials causing wakes and/or velocity deficits between the pressure side air 88 and the suction side air 90 downstream of the airfoil 62. More particularly, the pressurized air exhausted through the aperture(s) 92 may reduce the boundary condition between the pressure side air 88 and suction side air 90 thereby reducing the tonal noise generated by the airfoil 62 (e.g., the fan blade 44) and/or the interaction of the airflow 50 with the downstream stationary components (e.g., the outlet guide vanes 42).

As further illustrated in FIG. 3, the one or more apertures 92 may include at least one blow hole 98 such as a plurality of blow holes 98 extending along the span S within the trailing edge sheath 82. In one such embodiment, the plurality of blow holes 98 may define one or more gaps 100 between adjacent blow holes 98. Further, each gap 100 of the one or more gaps 100 may define the same length. As such, the blow holes 98 may be evenly spaced along the span S within the trailing edge sheath 82. More particularly, in such an embodiment, the trailing edge sheath 82 may supply pressurized air generally evenly along the trailing edge 74 of the airfoil 62.

Figure 4:
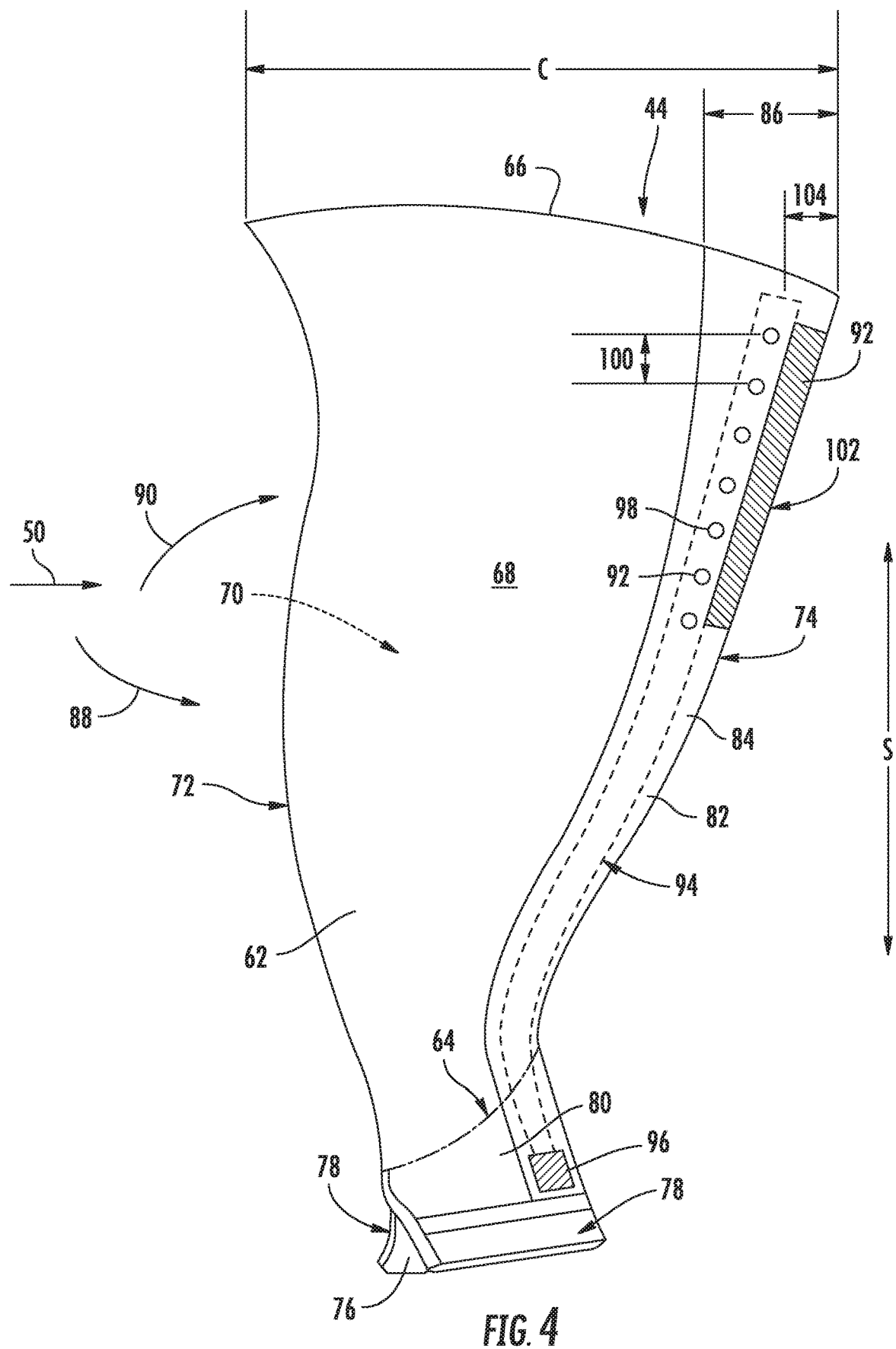
FIG. 4 illustrates another embodiment of the fan blade in accordance with aspects of the present subject matter, particularly illustrating apertures positioned toward the airfoil tip.

Referring now to FIG. 4, another embodiment of the airfoil 62 is illustrated in accordance with aspects of the present subject matter. Particularly, FIG. 4 illustrates the airfoil 62 including apertures 92 positioned toward the airfoil tip 66. As shown, each aperture 92 of the one or more apertures 92 may be positioned between a point along the span S 50% of the span S from the airfoil root 64 and the airfoil tip 66. In other embodiments, apertures 92 may be positioned between the airfoil tip 66 and a point along the span S 25% of the span S from the airfoil tip 66. For example, apertures 92 configured as blow holes 98 may be positioned toward the airfoil tip 66 on at least one of pressure side 68 and the suction side 70 (not shown). For instance, the blow holes 98 may be positioned to mirror each other on the pressure and suction sides 68, 70. It should be appreciated that the aperture(s) 92 may be positioned at any point along the span S within the trailing edge sheath 82. In certain embodiments, apertures 92 configured as blow holes 98 may be positioned at or proximate to the trailing edge 74.

It should also be appreciated that the apertures 92 (e.g., the blow holes 98) may be arranged at any position along the chord C within the trailing edge sheath 82. For example, the aperture(s) 92 may be placed at any point along the span S within the first width 86 of the trailing edge sheath 82. More particularly, the aperture(s) 92 may be positioned at any percentage of the chord C within the first width 86 at any point along the span S within the trailing edge sheath 82. For instance, in one embodiment, the one or more apertures 92 may each define a second width 104 from the trailing edge 74 along the chord C at the point along the span S of each aperture 92. As such, it should be appreciated that the second width 104 may be less than the first width 86 at the point along the span S of each aperture 92. In one embodiment, each aperture 92 may define a second width 104 between 10% and 20% of the chord C from the trailing edge 74 at the point along the span S of each aperture 92. For instance, each aperture 92 may define a second width 104 of the same or approximately the same percentage of the chord C at the point along the span S of each respective aperture 92. Though, in further embodiments, one or more apertures 92 may define distinct second widths 104 or a plurality of discrete second widths 104 so long as the second width 104 is less than the first width 86 at the point along the span S of each aperture 92.

In further embodiments, the one or more apertures 92 may include one or more slots 102. For instance, as shown in FIG. 4, the trailing edge sheath 82 may define the slot 102 positioned at or approximately at the trailing edge 74. The slot 102 may be extend along the span S any length less than or equal to the length of the trailing edge sheath 82 along the span S. Further, the slot(s) 102 may be positioned on the pressure side 68 and/or the suction side 70. In general, it should be appreciated that the slot(s) 102 may be positioned anywhere the blow hole(s) 98 may be positioned and vice versa. Further, it should be recognized that the trailing edge sheath 82 may include the aperture(s) 92 configured as the slot(s) 102, the blow hole(s) 98, or any combination of the two. In other embodiments, the aperture(s) 92 may define any shape or cross-section suitable to exhaust pressurized air from the fluid passageway 94 to the outer surface 84 of the trailing edge sheath 82.

Referring now to FIG. 5, a further embodiment of the airfoil 62 is illustrated in accordance to aspects of the present subject matter. Particularly, FIG. 5 illustrates a cross-section of the airfoil along the span S and chord C at the point along the span of at least one aperture 92. As shown, the apertures 92 (configured as blow holes 98 in FIG. 5) may mirror each other on the pressure and suction sides 68, 70. For instance, two or more blow holes 98 may be positioned at the same or approximately the same point along the span S and the same point along the chord C on each of the pressure side and suction sides 68, 70. In further embodiments, it should be appreciated that the apertures 92 on the pressure and suction sides 68, 70 may be staggered relative to one another along the span S.

As further illustrated in FIG. 5, the trailing edge sheath 82 may define the cross-sectional shape of the fluid passageway 94. For example, the fluid passageway 94 may generally define the same cross-sectional shape of the trailing edge sheath 82 at the point along the span S of the aperture(s) 92. As such, the trailing edge sheath 82 may define the fluid passageway 94 along the pressure side 68, trailing edge 74, and/or suction side 70 between an inner portion 112 of the trailing edge sheath 82 and an outer portion 114 of the trailing edge sheath 82. It should be appreciated that, in other embodiment, the trailing edge sheath 82 may define a localized fluid passageway 94 along the span S and positioned on one of the pressure or suction sides 68, 70 at the second width 104 to supply the pressurized air to the aperture 92. For instance, one fluid passageway 94 may extend from the fluid inlet 96 along the span S and at a point along the pressure side 68 or suction side 70 (e.g., the second width 104) where a series of apertures 92 extend along the span S from the airfoil root 64 to the airfoil tip 66. In another embodiment, one fluid passageway 94 may extend along the span S at the trailing edge 74 to supply apertures 92 at the trailing edge 74 with the pressurized air. In still further embodiments, two or more fluid passageways 94 may extend along the span S at separate portions of the pressure side 68, suction side 70, and/or the trailing edge 74 to supply one or more apertures 92 extending along the span S at each respective portion.

As shown in the depicted embodiment, each aperture 92 may define an aperture length 108 extending through the outer portion 114 of the trailing edge sheath 82. Further, each aperture 92 may define an aperture width 106 on the outer surface 84 of the trailing edge sheath 82. The aperture width 106 may be the maximum dimension of the each aperture 92 on the outer surface 84. For instance, in certain embodiments, the aperture(s) 92 may be configured as the blow holes 98 such that the aperture width 106 is a diameter of the blow hole(s) 98 on the outer surface 84 of the trailing edge sheath 82. More particularly, the blow hole(s) 98 and/or apertures 92 may define an approximately circumferential cross-section such that the aperture width 106 is the diameter of the aperture 92 and/or blow hole 98 on the outer surface 84. It should be appreciated that in other embodiments the apertures 92 and/or blow holes 98 may define any other cross-sectional shape, such as an elliptical shape, square shape, rectangular shape, diamond shape, or any other polynomial or suitable shape. In various such embodiments, the aperture width 106 may be the maximum dimension of the aperture 92 on the outer surface 84.

Further, one or more apertures 92 and/or blow holes 98 may define a ratio of the aperture length 108 over the aperture width 106 of between 0.8 and 1.2. More particularly, in one embodiment, the ratio of the aperture length 108 over the aperture width 106 may be between 0.9 and 1.1. For example, the ratio of the aperture length 108 over the aperture width 106 may be 1 or approximately 1. Additionally, as depicted, one or more apertures 92 and/or blow holes 98 may define a centerline 116 extending along the aperture length 108. Further, one or more apertures 92 and/or blow holes 98 may define an exterior line 109 on the outer surface 84 tangent to a point nearest the leading edge 111 and a point nearest the trailing edge 113 of the aperture(s) 92 on the outer surface 84. In one embodiment, one or more of the apertures 92 and/or blow holes 98 may include a centerline 116 defining an aperture angle 110 between the centerline 116 and the exterior line 109 of the trailing edge sheath 82. For instance, the aperture angle 110 may be between five degrees and forty degrees. For example, the aperture angle 110 may be at least fifteen degrees but less than or equal to thirty degrees.

Referring generally to FIGS. 2-5, the airfoil 62 may be configured as a fan blade 44 of the fan section 16. For instance, each of the fan blades 44 of the fan section 16 may be configured as one or more of the airfoils 62 as described in regards to FIGS. 2-5 (e.g., a noise reducing airfoil). Further, in certain embodiments, each of the fan blades 44 may be configured generally as the fan blade of FIG. 3. For instance, one or more apertures 92 may be positioned between the airfoil root 64 and the airfoil tip 66. However, though blow holes 98 are illustrated in FIG. 3, it should be appreciated each fan blade 44 may also include, or alternatively include, one or more slots 102 (FIG. 4) arranged between the airfoil root 64 and the airfoil tip 66. In other embodiments, each fan blade 44 may be configured generally as the fan blade 44 of FIG. 4. For example, one or more apertures 92 (e.g., the blow hole(s) 98 and/or the slot(s) 102) may be positioned generally toward the airfoil tip 66. For example, in one embodiment, each aperture 92 may be positioned between a point along the span S 50% of the span S from the airfoil root 64 and the airfoil tip 66. For instance, in one embodiment, each aperture 92 may be positioned between the airfoil tip 66 and a point along the span S within 25% of the span S from the airfoil tip 66.

Figure 6:
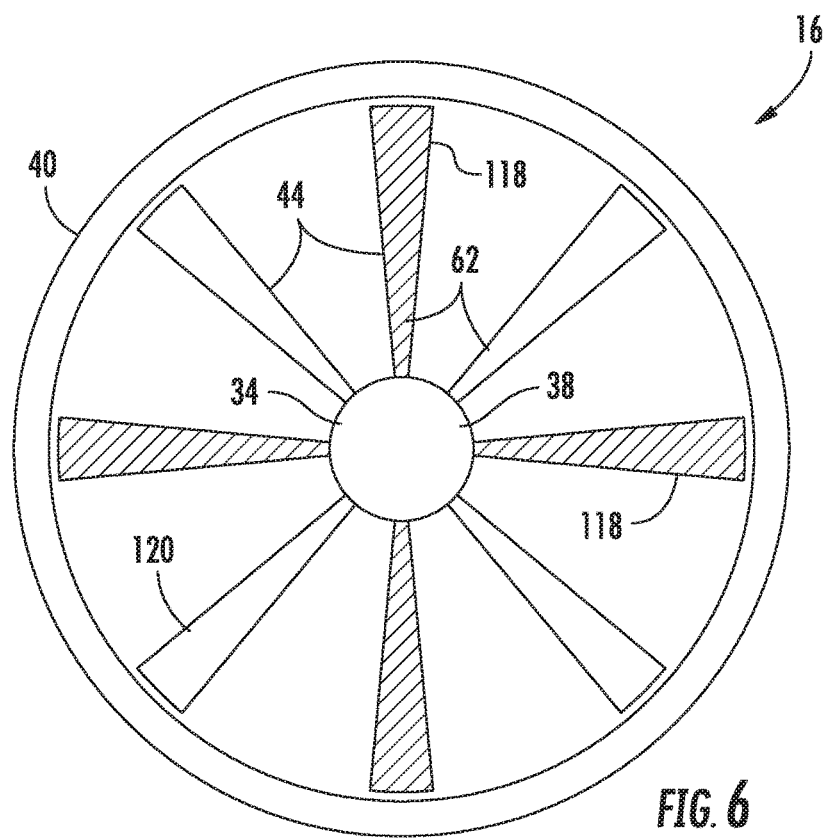
FIG. 6 illustrates one embodiment of the fan section in accordance with aspects of the present subject matter, particularly illustrating a portion of the fan blades configured as noise reducing airfoils.

Referring now to FIG. 6, one embodiment of a fan section 16 is illustrated in accordance with aspects of the present subject matter. Particularly, FIG. 6 illustrates a portion of the fan blades 44 configured as noise reducing airfoils. It should be understood that the embodiment of FIG. 6 includes a representative number of fan blades 44. As such, other embodiments may include more or less fan blades 44. Additionally, though illustrated in the context of a fan section 16 of a gas turbine engine 10, it should be appreciated that airfoils 62 may generally be configured as the fan blades 44 of the fan section 16 in other contexts, such as airfoils of a propeller, airfoils of a compressor, and/or airfoils of a turbine.

As shown in FIG. 6, the plurality of fan blades 44 may include a first plurality of airfoils 118 (represented by shading in FIG. 6) and a second plurality of airfoil 120 (the unshaded fan blades 44 of FIG. 6). Moreover, the first plurality of airfoils 118 and the second plurality of airfoils 120 may be arranged to alternate around the engine shaft (e.g., the LP shaft 34) and/or the fan rotor 38. In such an embodiment, the first plurality of airfoils 118 may each be configured as noise reducing airfoils. For example, one or more of the first plurality of airfoils 118 may be configured as any of the airfoils 62 of FIGS. 3-5 or any combinations of features represented in the airfoils 62 of FIGS. 3-5. In one embodiment, each of the first plurality of airfoils 118 may be configured generally the same. For example, each of the first plurality of airfoils 118 may be configured generally as the airfoil 62 of FIG. 4. Further, it should be appreciated that the second plurality of airfoils 120 may not include apertures 92. In certain embodiments, the second plurality of airfoils 120 may each also not include the trailing edge sheath 82.

Figure 7:
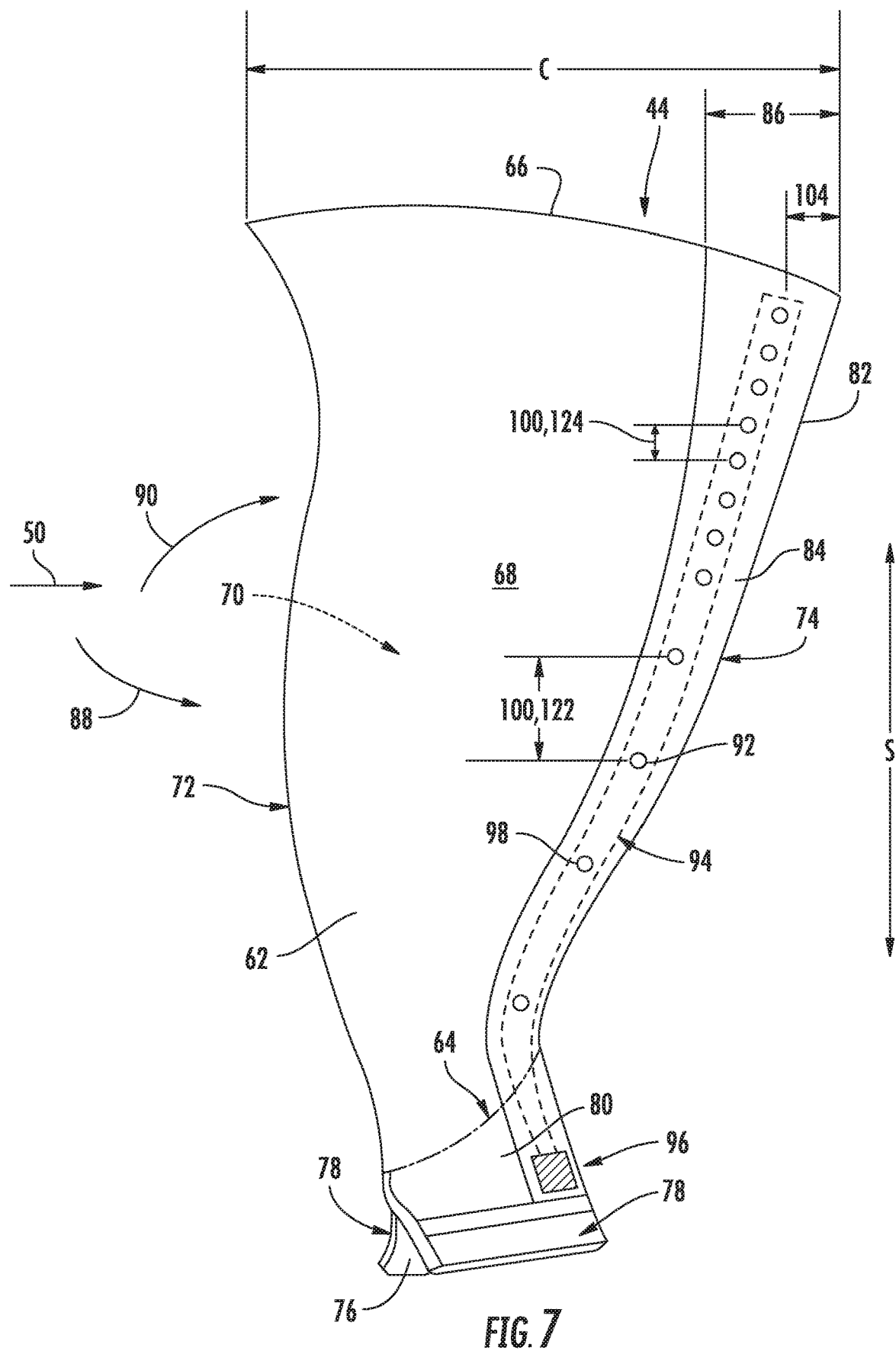
FIG. 7 illustrates a further embodiment of the fan blade in accordance with aspects of the present subject matter, particularly illustrating apertures clustered toward the airfoil tip.

Referring now to FIG. 7, another embodiment of the airfoil 62 is illustrated in accordance with aspects of the present subject matter. Particularly, FIG. 7 illustrates an airfoil with apertures 92 clustered toward the airfoil tip 66. Further, it should be appreciated that the first plurality of airfoils 118 of FIG. 6 may be configured as the airfoil of FIG. 7. In the illustrated embodiment, the apertures 92 are configured as blow holes 98. For example, the one or more apertures 92 may include a plurality of blow holes 98 extending along the span S. For instance, blow holes 98 may extend along the span S on at least one of the pressure side 68, suction side 70, and/or trailing edge 74. For instance, blow holes 98 may mirror each other along the pressure and suction sides 68, 70 or may be staggered along the pressure and suction sides 68, 70.

Moreover, the plurality of blow holes 98 may define at least one gap 100 between adjacent blow holes 98. Further, at least one gap 100 proximate to the airfoil root 64 may define a first length 122, and at least one gap 100 proximate to the airfoil tip 66 may define a second length 124 different than the first length 122. Further, the first length 122 may be longer than the second length 124. As such, the blow holes 98 may be placed closer together and/or clustered toward the airfoil tip 66 of the airfoil 62. For instance, in one embodiment, each gap 100 between the airfoil tip 66 and a point within 50% of the span S from the airfoil tip 66 may define the second length 124. In such an embodiment, each gap 100 between the airfoil root 64 and a point along the span S within 50% of the span S from the airfoil root 64 may define the first length 122. Though, in a further embodiment, the gaps 100 defining the second length 124 may be positioned between the airfoil tip 66 and a point along the span S within 25% of the span S from the airfoil tip 66.

It should be appreciated that grouping apertures 92 (such as the blow holes 98) closer together near the airfoil tip 66 may provide pressurized air along the portion of the airfoil 62 creating the largest wakes and/or velocity deficits between the pressure side air 88 and the suction side air 90. Further, grouping the apertures 92 farther apart near the airfoil root 64 may reduce the amount of pressurized air exhausted along the portion of the airfoil 62 creating relatively smaller wakes and/or velocity deficits relative to the airfoil tip 66. As such, the noise produced by the airfoil 62 may be reduced while also improving the efficiency of the gas turbine engine 10. Further, by alternating noise reducing airfoils (e.g., the first plurality of airfoils 118 of FIG. 6) with non-noise reducing airfoils (e.g., the second plurality of airfoils 120 of FIG. 6) the amount of pressurized air exhausted from the apertures 92 may be reduced while still reducing the tonal noise generated by the airfoils 62. It should further be appreciated that reducing the amount of pressurized air exhausted from the apertures 92 may reduce the amount of pressurized air required from the pressure source (e.g., the LP compressor 22), thereby increasing the efficiency of the gas turbine engine 10.

In one embodiment, the airfoil 62 and/or trailing edge sheath 82 may include at least one of a metal, metal alloy, or composite. For instance, the airfoil 62 and/or trailing edge sheath 82 may be formed at least partially from a ceramic matrix composite. More particularly, in certain embodiments, the airfoil 62 and trailing edge sheath 82 may be formed from one or more ceramic matrix composite prepreg plies. For instance, such prepreg plies forming the trailing edge sheath 82 may be wrapped around the trailing edge 74 of the airfoil 62 and cured and processed to form the trailing edge sheath 82. In other embodiments, the airfoil 62 and/or trailing edge sheath 82 may be formed at least partially from a metal, such as but not limited to, steel, titanium, aluminum, nickel, or alloys of each. For instance, in certain embodiments, the airfoil 62 and/or trailing edge sheath 82 may be cast. In one particular embodiment, the airfoil 62 may be formed from a ceramic matrix composite while the trailing edge sheath 82 may be formed from a metal. Though, it should be recognized that the airfoil 62 and/or trailing edge sheath 82 may be formed from multiple materials, such as a combination of metals, metal alloys, and/or composites.

Composite materials may include, but are not limited to, metal matrix composites (MMCs), polymer matrix composites (PMCs), or ceramic matrix composites (CMCs). Composite materials, such as may be utilized in the airfoil 62 and/or trailing edge sheath 82, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, in various embodiments, PMC materials may be fabricated by impregnating a fabric or unidirectional tape with a resin (prepreg), followed by curing. For example, multiple layers of prepreg may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the pressure side 68 or the suction side 70). The PMC material is placed inside of a bag and a vacuum is utilized to hold the PMC material against the die during curing. In still other embodiments, the airfoil 62 and/or trailing edge sheath 82 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermosplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A noise reducing airfoil defining a span extending between a root and a tip and a chord at each point along the span extending between a leading edge and a trailing edge, the airfoil comprising:
   a pressure side;
   a suction side; and
   a trailing edge sheath, defining an outer surface, coupled to the trailing edge of the airfoil and extending at least partially along the chord on the pressure and suction sides at each point along the span within the trailing edge sheath, wherein the trailing edge sheath defines a fluid passageway extending along at least a portion of the span, and wherein the trailing edge sheath defines at least one aperture on at least one of the pressure side, the suction side, or trailing edge fluidly coupling the fluid passageway to the outer surface;

wherein the airfoil is a fan blade of a gas turbine engine.

2. The airfoil of claim 1, wherein the at least one aperture is configured to supply pressurized air from the fluid passageway to the outer surface to reduce wakes, velocity deficits, or both.

3. The airfoil of claim 1, further comprising:
a fluid inlet at the root fluidly coupled to the fluid passageway.

4. The airfoil of claim 1, wherein the trailing edge sheath extends between the root and the tip along the span.

5. The airfoil of claim 1, wherein each aperture of the at least one aperture is positioned between a point along the span 50% of the span from the root and the tip.

6. A noise reducing airfoil defining a span extending between a root and a tip and a chord at each point along the span extending between a leading edge and a trailing edge, the airfoil comprising:
a pressure side;
a suction side; and
a trailing edge sheath, defining an outer surface, coupled to the trailing edge of the airfoil and extending at least partially along the chord on the pressure and suction sides at each point along the span within the trailing edge sheath, wherein the trailing edge sheath defines a fluid passageway extending along at least a portion of the span, and wherein the trailing edge sheath defines at least one aperture on at least one of the pressure side, the suction side, or trailing edge fluidly coupling the fluid passageway to the outer surface;
wherein each aperture of the at least one aperture is positioned on the pressure or suction side, and wherein each aperture of the at least one aperture is positioned between 10% and 20% of the chord from the trailing edge at a point along the span of each aperture.

7. The airfoil of claim 1, wherein the at least one aperture comprises at least one slot.

8. The airfoil of claim 1, wherein the at least one aperture comprises a plurality of blow holes distributed along the span.

9. The airfoil of claim 8, wherein the plurality of blow holes define at least one gap between adjacent blow holes, and wherein each gap of the at least one gap defines the same length.

10. The airfoil of claim 8, wherein the plurality of blow holes define at least one gap between adjacent blow holes, at least one gap proximate to the root defining a first length, and at least one gap proximate to the tip defining a second length different than the first length, and wherein the first length is longer than the second length.

11. The airfoil of claim 8, wherein each blow hole of the plurality of blow holes defines a width on the outer surface and a length through the trailing edge sheath, and wherein at least one blow hole defines a ratio of the length over the width between 0.9 and 1.1.

12. The airfoil of claim 8, wherein each blow hole of the plurality of blow holes defines a centerline and an exterior line on the outer surface tangent to a point nearest the leading edge and a point nearest the trailing edge of each blow hole on the outer surface, and wherein at least one of the blow holes defines a centerline having an aperture angle between the centerline and the exterior line of at least fifteen degrees but less than or equal to thirty degrees.

13. A gas turbine engine defining a central axis, the gas turbine engine comprising:
an engine shaft extending along the central axis;
a compressor attached to the engine shaft and extending radially about the central axis;
a combustor positioned downstream of the compressor to receive a compressed fluid therefrom;
a turbine mounted on the engine shaft downstream of the combustor to provide a rotational force to the compressor; and
a plurality of airfoils operably connected to the engine shaft, each of the plurality of airfoils defining a span extending between a root and a tip and a chord at each point along the span extending between a leading edge and a trailing edge, the plurality of airfoils including at least one noise reducing airfoil comprising:
a pressure side;
a suction side; and
a trailing edge sheath, defining an outer surface, coupled to the trailing edge of the airfoil and extending at least partially along the chord on the pressure and suction sides at each point along the span within the trailing edge sheath, wherein the trailing edge sheath defines a fluid passageway extending along at least a portion of the span, and wherein the trailing edge sheath defines at least one aperture on at least one of the pressure side, the suction side, or trailing edge fluidly coupling the fluid passageway to the outer surface;
further comprising a fan section including the plurality of airfoils configured as fan blades.

14. The gas turbine engine of claim 13, wherein each airfoil of the plurality of airfoils is a noise reducing airfoil.

15. The gas turbine engine of claim 14, wherein each aperture of the at least one aperture is positioned between a point along the span 50% of the span from the root and the tip.

16. The gas turbine engine of claim 13, wherein the plurality of airfoils comprises a first plurality of airfoils and a second plurality of airfoils arranged to alternate around the engine shaft, wherein each airfoil of the first plurality of airfoils is a noise reducing airfoil.

17. The gas turbine engine of claim 16, wherein the at least one aperture comprises a plurality of blow holes distributed along the span, the plurality of blow holes defining at least one gap between adjacent blow holes, and wherein at least one gap proximate to the root defines a first length, and at least one gap proximate to the tip defines a second length different than the first length, and wherein the first length is longer than the second length.

18. The gas turbine engine of claim 13, wherein the compressor is fluidly coupled to a fluid inlet at the root of each noise reducing airfoil such that the compressor is fluidly coupled to the fluid passageway.

* * * * *